(12) United States Patent
Wang et al.

(10) Patent No.: US 11,493,685 B2
(45) Date of Patent: Nov. 8, 2022

(54) POLARIZATION-MAINTAINING HOLLOW-CORE ANTIRESONANT FIBER

(71) Applicant: Jinan University, Guangzhou (CN)

(72) Inventors: Yingying Wang, Guangzhou (CN); Yifeng Hong, Guangzhou (CN); Shoufei Gao, Guangzhou (CN); Wei Ding, Guangzhou (CN)

(73) Assignee: JINAN UNIVERSITY, Guangzhou (CN)

( * ) Notice: Subject to any disclaimer, the term of this patent is extended or adjusted under 35 U.S.C. 154(b) by 0 days.

(21) Appl. No.: 17/306,321

(22) Filed: May 3, 2021

(65) Prior Publication Data

US 2021/0382227 A1 Dec. 9, 2021

(30) Foreign Application Priority Data

May 10, 2020 (CN) .......................... 202010389652.4
May 19, 2020 (CN) .......................... 202010425227.6

(51) Int. Cl.
G02B 6/02 (2006.01)
G02B 6/024 (2006.01)
G02B 6/032 (2006.01)

(52) U.S. Cl.
CPC ......... *G02B 6/024* (2013.01); *G02B 6/02304* (2013.01); *G02B 6/032* (2013.01)

(58) Field of Classification Search
CPC ..... G02B 6/02304; G02B 6/024; G02B 6/032
See application file for complete search history.

(56) References Cited

U.S. PATENT DOCUMENTS

| | | | | | |
|---|---|---|---|---|---|
| 9,810,837 | B2 * | 11/2017 | Benabid | ............. | G02B 6/02347 |
| 10,139,560 | B2 * | 11/2018 | Poletti | ................. | H01S 3/06729 |
| 10,393,956 | B2 * | 8/2019 | Russell | ................. | G02B 6/024 |
| 10,527,782 | B2 * | 1/2020 | Lyngsøe | ............. | C03B 37/0122 |
| 10,816,721 | B1 * | 10/2020 | Chenard | ............ | G02B 6/02328 |
| 10,859,763 | B2 * | 12/2020 | Xu | ...................... | G02B 6/02328 |
| 11,009,654 | B2 * | 5/2021 | Wang | ................. | G02B 6/02304 |
| 11,209,591 | B2 * | 12/2021 | Gao | ....................... | G02B 6/032 |
| 11,215,751 | B2 * | 1/2022 | Poletti | .................... | G02B 6/024 |
| 11,249,250 | B2 * | 2/2022 | Jasion | .................... | G02B 6/032 |
| 2019/0212148 | A1 * | 7/2019 | Sanders | ............... | G01C 19/727 |
| 2020/0156987 | A1 * | 5/2020 | Wheeler | ............ | G02B 6/02328 |

* cited by examiner

*Primary Examiner* — Ryan A Lepisto
(74) *Attorney, Agent, or Firm* — Dragon Sun Law Firm, PC; Jinggao Li, Esq.; Nathaniel Perkins

(57) ABSTRACT

The present disclosure discloses a polarization-maintaining hollow-core antiresonant fiber. An inner layer of the polarization-maintaining hollow-core antiresonant fiber includes first thin walls, second thin walls, and third thin walls. The present disclosure introduces high birefringence through the wall thickness difference between the first thin wall and the second thin wall, and effectively amplifies a birefringence effect achieved by the wall thickness difference through quasi multi-symmetric structures of the first thin walls and the second thin walls. In addition, the present disclosure reduces the transmission loss and suppresses the leakage of light through the inner layer, particularly, the third thin walls of the inner layer, so that the fiber of the present disclosure realizes polarization maintaining, and meanwhile, reduce the loss as far as possible.

13 Claims, 6 Drawing Sheets

POLARIZATION-MAINTAINING HOLLOW-CORE ANTIRESONANT FIBER

CROSS REFERENCE TO RELATED APPLICATION(S)

This patent application claims the benefit and priority of Chinese Patent Application No. 202010425227.6, filed on May 19, 2020, which claims the benefit and priority of Chinese Patent Application No. 202010389652.4, filed on May 10, 2020, these application all are incorporated by reference herein in its entirety.

TECHNICAL FIELD

The present disclosure belongs to the technical field of optics and laser optoelectronics, and particularly, relates to a polarization-maintaining hollow-core antiresonant fiber.

BACKGROUND ART

As a main research direction of fiber optics, a hollow-core fiber has some significant advantages because it uses the air of a fiber core to guide light. Compared with a solid-core fiber, the hollow-core fiber can realize the optical transmission with ultra-low loss and low nonlinearity in principle by using ultra-low Rayleigh scattering and nonlinear coefficients of air (several magnitude orders lower than those of all glass materials). In addition, it can also provide higher propagation velocity (that is, less delay) and a laser damage threshold value.

At present, hollow-core fibers can mainly be divided into two categories: hollow-core photonic bandgap fibers using periodically arranged micro-structures and hollow-core anti-resonant fibers using local coherent cancellation of a light field. Polarization-maintaining performance (for example, introduction of high birefringence) is the key to decide wide application range of fibers in optics. Precision interference sensing, quantum computing, atomic spectroscopy, and polarization-maintaining optical amplifiers are all applications on the premise of the polarization-maintaining performance. However, different from the solid-core fiber, it is not easy to realize high birefringence with the magnitude order of 10-4 in the hollow-core fiber due to the lack of mechanical stress. In addition, the light in a fiber core mode of the hollow-core fiber has low overlap degree with glass, and it is also difficult to achieve substantial birefringence by using deliberate geometric asymmetry.

The hollow-core fiber can use the effective refractive index change with polarization correlation introduced by an anti-cross coupling effect of the fiber core mode and a cladding high refractive index medium mode, so as to introduce the high birefringence. Although the hollow-core photonic bandgap fiber can introduce the birefringence with the magnitude order of 10-4 by means of the interaction between a surface mode and the fiber core mode, the dominant surface scattering loss reduces the possibility of further optimization thereof. Although the design of a large-fiber core and low-loss polarization-maintaining photonic bandgap fiber configured with shunt holes (the fiber core is provided with 19 air holes) improves the mode purity of the fiber, and reduces the overlap degree of a mode field and different medium interlayer interfaces. However, too narrow working bandwidth (usually less than 10 nm) increases the drawing difficulty of the fiber and makes it difficult to be widely applied. The hollow-core antiresonant fiber uses the local coherent cancellation of the light field in a cladding area, so the overlap degree between the mode field and different medium interlayer interfaces is lower than that with the photonic bandgap fiber, the theoretical minimum loss can be lower than that of the traditional quartz fiber, and the hollow-core antiresonant fiber has more optimization potential. Meanwhile, the broadband (hundred nanometer scale) birefringence with the magnitude order of 10-4 can be realized by changing the thickness of an anti-resonant layer of the fiber and by means of the anti-cross coupling of the fiber code mode and the cladding mode, so the application range is wider compared with that of a bandgap fiber. However, some of the polarization-maintaining hollow-core anti-resonant reflective fibers proposed by academia have over-high transmission loss, and some of them have complex structures, which leads to the lack of novel designs of polarization-maintaining hollow-core antiresonant fibers in the field.

SUMMARY

With regard to the disadvantages in the above-mentioned problems, the present disclosure provides a polarization-maintaining hollow-core antiresonant fiber, including:

a hollow fiber core, an inner layer, and an outer layer in sequence in the direction from the inside to the outside of the fiber.

The inner layer includes an inner side structure closer to the fiber core and an outer side structure further away from the fiber core, and the outer side structure is located between the inner side structure and the outer layer.

The inner side structure includes four thin walls that are not in contact with one another and are orthogonally and symmetrically distributed on the periphery of the fiber core to realize birefringence, and the four thin walls are supported by the outer layer. The four thin walls include: two first thin walls spaced by the fiber core in a first direction, and two second thin walls spaced by the fiber core in a second direction orthogonal to the first direction. In addition, the wall thicknesses of the four thin walls are not exactly the same.

The outer side structure includes four closed cavities with the same structures. Any one of the four thin walls and the outer layer form a closed cavity, and each closed cavity is provided with a third thin wall.

Preferably, two third thin walls are arranged in each closed cavity. The end surfaces of the third thin walls include any one of the following structures: concentric fan-shaped thin-walled structures with outward openings, nested casing thin-walled structures, two annular thin-walled structures that are not in contact with each other, or annular thin-walled structures with thin-walled spacers arranged in the centers.

Preferably, the inner side structure is also provided with a structure that can amplify a birefringence effect. The structure includes: four fan-shaped thin-walled structures with thin walls in quasi quadruple symmetry and outward openings, or four circular thin-walled structures with thin walls in quasi quadruple symmetry. The quasi quadruple symmetry refers to: on the basis of complete quadruple symmetry, the two first thin walls in the first direction have the first wall thickness a, and the two second thin walls in the second direction have the second wall thickness a', where the first wall thickness a is not equal to the second wall thickness a'.

Preferably, the wall thickness difference between either of the first thin walls in the first direction and either of the second thin walls in the second direction exceeds 10% of the wall thickness value of either of the first thin wall and the second thin wall.

Preferably, the two first thin walls in the first direction have equal wall thickness or the wall thickness difference less than 10% of the wall thickness value of either of the two first thin walls.

Preferably, the two second thin walls in the second direction have equal wall thickness or the wall thickness difference less than 10% of the wall thickness value of either of the two second thin walls.

Preferably, the wall thicknesses of the first, second, and third thin walls are valued according to the difference of light guide bands or the difference of Terahertz bands.

Preferably, the first thin walls and the second thin walls are two types of thin walls, where the wall thickness of either of the thin walls of each type is uniform and consistent.

Preferably, any two of the second thin walls are not in contact with each other, and the first thin walls are not in contact with the second thin walls.

Preferably, the first thin walls, the second thin walls, and the third thin walls all have equal refractive index.

Compared with the prior art, the present disclosure has the following beneficial effects:

1. The present disclosure realizes good birefringence through the above-mentioned first thin walls and second thin walls with not exactly the same wall thickness.

2. The structure of the present disclosure is relative simple.

3. The present disclosure can further introduce high birefringence through specific wall thickness difference of the first thin walls and the second thin walls of the inner layer in orthogonal directions, so as to realize a better polarization maintaining effect.

Figure 1:
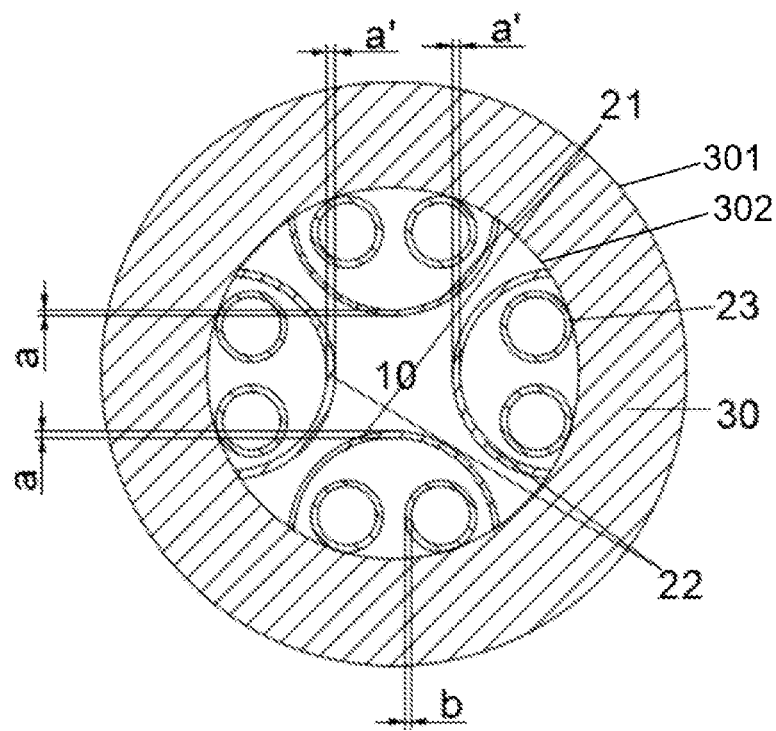
FIG. 1 is a structural diagram of an end surface/radial section of a polarization-maintaining hollow-core antiresonant fiber in one embodiment of the present disclosure.
Figure 2A:
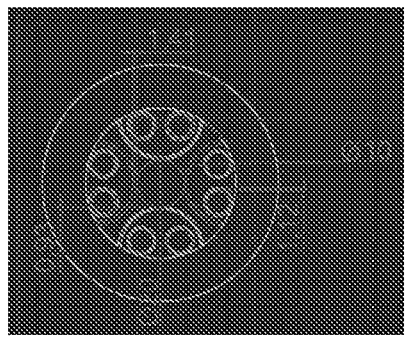
FIG. 2A to FIG. 2D are the loss and birefringence curves, calculated by using finite element simulation, of the structure shown in FIG. 1 in the case of exemplary constraints of some structural parameters.
Figure 2B:
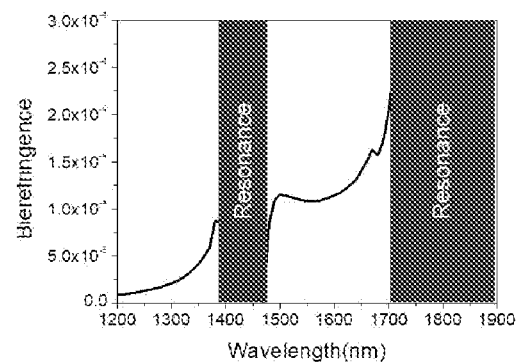
Figure 2C:
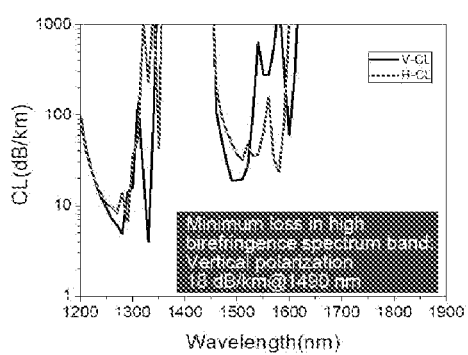
Figure 2D:
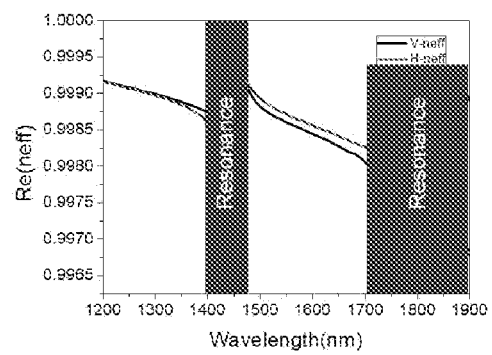

10—first core; 20—inner layer; 21—first thin wall; 22—second thin wall; 23—third thin wall; 30—outer layer; 301—circular outer wall; 302—circular inner wall; a is the wall thickness of a first thin wall in a first direction; a' is the wall thickness of a second thin wall in a second direction; b is the wall thickness of a third thin wall.

DETAILED DESCRIPTION OF THE EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are part rather than all of the embodiments of the present disclosure. On the basis of the embodiments of the present disclosure, all other embodiments obtained by those of ordinary skill in the art without creative work fall within the scope of protection of the present disclosure.

The following further describes the present disclosure in detail with reference to the accompanying drawings:

In one embodiment, the present disclosure discloses a polarization-maintaining hollow-core antiresonant fiber, including:

a hollow fiber core, an inner layer, and an outer layer in sequence in the direction from the inside to the outside of the fiber.

The inner layer includes an inner side structure closer to the fiber core and an outer side structure further away from the fiber core, and the outer side structure is located between the inner side structure and the outer layer.

The inner side structure includes four thin walls that are not in contact with one another and are orthogonally and symmetrically distributed on the periphery of the fiber core to realize birefringence, and the four thin walls are supported by the outer layer, where the four thin walls include two first thin walls spaced by the fiber core in a first direction, and two second thin walls spaced by the fiber core in a second direction orthogonal to the first direction. In addition, the wall thicknesses of the four thin walls are not exactly the same.

The outer side structure includes four closed cavities with the same structures, where any one of the four thin walls and the outer layer form a closed cavity, and each closed cavity is provided with a third thin wall.

For the above-mentioned embodiment, its core technical contribution lies in its inner layer, specifically, the inner side structure and the outer side structure of the inner layer. Because of the above-mentioned inner side structure and outer side structure, the inner layer achieves birefringence through its inner side structure, and reduces the transmission loss and suppresses the leakage of light through its outer side structure Accurately speaking, the four orthogonal thin walls with a first refractive index in the inner side structure achieves birefringence through the design of the wall thicknesses that are not exactly the same, and the third thin walls in the outer side structure reduce the transmission loss of the fiber and suppress the leakage of light. That it to say, a polarization-maintaining hollow-core antiresonant fiber is realized through the structural characteristics of the above-mentioned hollow-core antiresonant fiber. It can be understood that, for the polarization-maintaining hollow-core antiresonant fiber, it is self-evident that the parameters, such as the wall thicknesses and the diameters, of the first thin walls and the second thin walls, focus on meeting the requirement of maintaining polarization, and the parameters in the closed cavities focus on satisfying an antiresonance condition. The present disclosure realizes a polarization-maintaining hollow-core antiresonant fiber based on this principle. Therefore, it can be understood that the parameters of all structures disclosed in the present disclosure are only taken as exemplary parameters rather than being taken as any limitation to the inventive concept of the present disclosure.

In one embodiment, the refractive index of a fiber core medium is less than that of the first thin walls, the second thin walls, and the third thin walls.

It can be understood that the fiber core of the hollow-core fiber may be filled with one or more gases, may also be vacuum, and even may be filled with a liquid.

In another embodiment, each closed cavity is provided with at least two third thin walls.

It should be noted that when each closed cavity is provided with only one third thin wall, as long as the size of an air area in the closed cavity does not affect the realization of low loss, one third thin wall is also feasible. Preferably, in the present embodiment, at least two third thin walls are selected.

In another embodiment,
two third thin walls are arranged in each closed cavity. The end surfaces of the third thin walls include any one of the following structures: concentric fan-shaped thin-walled structures with outward openings, nested casing thin-walled structures, two annular thin-walled structures that are not in contact with each other, or annular thin-walled structures with thin-walled spacers arranged in the centers. It should be noted that, the above structures may refer to FIG. 1 to FIG. 4 that are described in detail hereinafter.

In another embodiment,
the inner side structure is also provided with a structure that can amplify a birefringence effect. The structure includes: four fan-shaped thin-walled structures with thin walls in quasi quadruple symmetry and outward openings, or four circular thin-walled structures with thin walls in quasi quadruple symmetry. The quasi quadruple symmetry refers to: on the basis of complete quadruple symmetry, the two first thin walls in the first direction have the first wall thickness a, and the two second thin walls in the second direction have the second wall thickness a', where the first wall thickness a is not equal to the second wall thickness a'.

For the present embodiment, the core idea is that: changing the wall thicknesses in the second direction and the first direction can break the degeneracy of the related walls of the inner side structure of the fiber, which results in different intensity and wavelength positions of anti-cross coupling between the related walls and a fiber core mode, and then introduces the effective refractive index change with polarization correlation, thereby introducing birefringence. It can be understood that, on this premise, the hollow-core antiresonant fiber with the characteristic of high birefringence can be obtained by further matching the selection of a proper fiber core size.

It should be noted that, compared with the quasi quadruple symmetric structure, although other symmetrical structures can produce the birefringence, the birefringence produced by other symmetrical structures is lower than that produced by the quasi quadruple symmetric structure in the case of the same fiber size and wall thickness ratio. Therefore, the quasi quadruple symmetric structure is preferred in the present disclosure.

In another embodiment,
the wall thickness difference between either of the first thin walls in the first direction and either of the second thin walls in the second direction exceeds 10% of the wall thickness value of either of the two thin walls.

In another embodiment,
the two first thin walls in the first direction have equal wall thickness or the wall thickness difference less than 10% of the wall thickness value of either of the first thin walls.

In another embodiment,
the two second thin walls in the second direction have equal wall thickness or the wall thickness difference less than 10% of the wall thickness value of either of the second thin walls.

It can be understood that the above 10% only shows an example, which represents that the related wall thickness difference does not exceed a certain range and does not have a great impact on the performance of the fiber. In other words, 10% only represents a specific example that the wall thicknesses of the two thin walls are approximately equal.

In another embodiment,
the wall thicknesses of the first, second, and third thin walls are valued according to the difference of light guide bands or the difference of Terahertz bands.

In another embodiment,
the first thin walls and the second thin walls are two types of thin walls, where the wall thickness of either of the thin walls of each type is uniform and consistent.

For the present embodiment, the wall thickness of any one of the thin walls is uniform and consistent, which is beneficial to the performance stability and loss reduction of the fiber. It should be noted that the first thin walls and the second thin walls in the present disclosure are equivalent to two types of thin walls. In a certain definite fiber structure, each type of thin walls may be multiple walls. Therefore, the uniformity and consistency referred in the present disclosure can act on each of the two types of the thin walls above, which is the connotation of "any thin wall" in the present embodiment. However, it can be understood that it is generally impossible to achieve theoretical uniformity and consistency of each wall everywhere due to the actual situation of an fiber process. Therefore, the definition of "uniformity and consistency" should not be too strict. In addition, there may be many types of structures of the third thin walls, which means that as a type of thin walls, the wall thickness of each wall of the third thin wall may not be uniform or consistent everywhere. For example, for a ring with a thin-walled spacer, the spacer and the ring may have unequal wall thicknesses. Of course, the wall thicknesses can also be set to be equal, for example, both the spacer and the ring are have the wall thickness of b.

In another embodiment,
any two of the second thin walls are not in contact with each other, and the first thin walls are not in contact with the second thin walls.

That is to say, the design of the present disclosure tends to a non-contact manner of the first thin walls and the second thin walls.

In another embodiment,
the first thin walls, the second thin walls, and the third thin walls all have equal refractive index.

It can be understood that this is beneficial to actual drawing of the fiber.

In another embodiment, the first thin wall is an arc-shaped thin wall corresponding to a first radius, and the second thin wall is an arc-shaped thin wall corresponding to a second radius.

In another embodiment, the arc radiuses and/or arc lengths corresponding to the first thin walls and the second thin walls can be further reduced, and simultaneously, the fiber core can be enlarged correspondingly, which can reduce the loss of the fiber.

In another embodiment, the third thin wall of the present disclosure is used for reducing the transmission loss and suppressing the leakage of light. The shape and the number of layers can be adjusted according to requirements and a second preparation direction, referring to multiple implementation manners shown in FIG. 1 to FIG. 8:

as shown in FIGS. 1, 3, 5 and 7, the present disclosure provides different types of low-loss hollow core antiresonant fibers, which include a fiber core 10, an inner layer 20, and an outer layer 30 in sequence from inside to outside.

The fiber core 10 consists of a low-refractive index medium, which is used for guiding the light to transmit in the axial direction of the fiber. The low-refractive index medium may be air, liquid or vacuum. The low refractive index medium of the present disclosure is preferably air. The fiber core 10 is a hollow-core channel shown in FIG. 1. The hollow-core channel is used for guiding the light to transmit in the axial direction of the fiber.

The inner layer 20 of the present disclosure is between the fiber core 10 and the outer layer 30. It is a high and low refractive index composite cladding area, namely, the inner layer 20 consists of first thin walls 21 and second thin walls 22 (high-refractive index medium compared with the fiber core) that are orthogonal to one another, third thin walls 23 (high-refractive index medium compared with the fiber core), and the fiber core (low-refractive index medium) filling the remaining area of the inner layer 20. The high-refractive index medium of the present disclosure may be various silica, soft glass, plastics, or the like, and more preferably, in light wave band, the high-refractive index medium is fused quartz. In Terahertz band, the high-refractive index medium is plastics. It should be noted that the outer layer 30 consists of a high-refractive index medium, and is used of supporting the first thin walls 21 and the third thin walls 23. Where:

As shown in FIG. 1, the end surfaces of the third thin walls 23 are of two separated annular thin-walled structures, and the two third thin walls 23 are uniformly distributed in the closed cavity.

Figure 3:
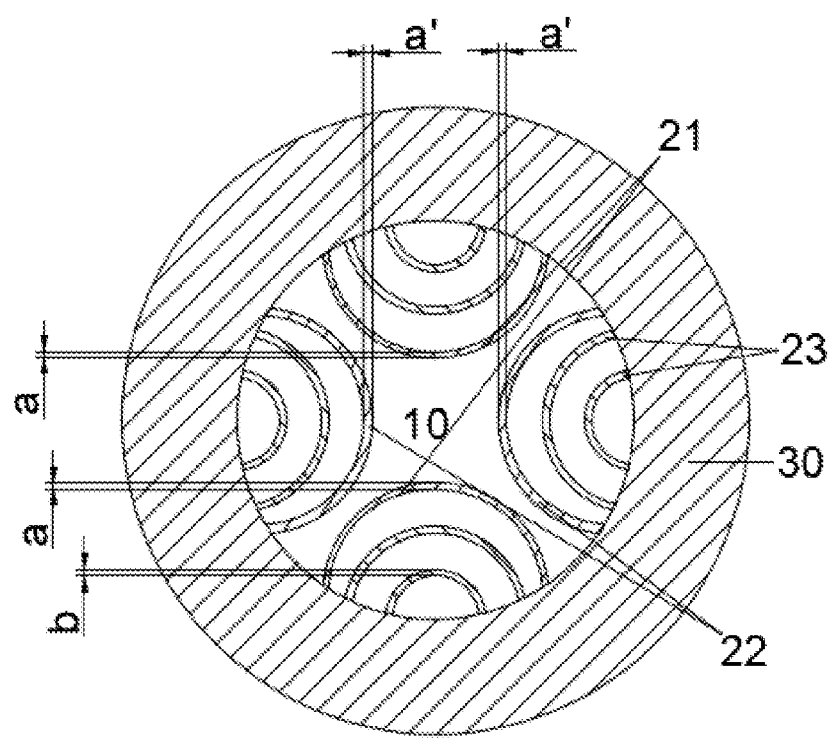
FIG. 3 is a structural diagram of an end surface/radial section of a polarization-maintaining hollow-core antiresonant fiber in another embodiment of the present disclosure.
Figure 4A:
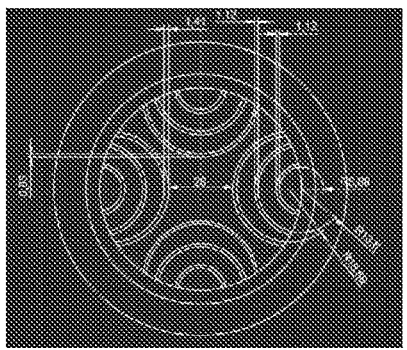
FIG. 4A to FIG. 4D are the loss and birefringence curves, calculated by using finite element simulation, of the structure shown in FIG. 3 in the case of exemplary constraints of some structural parameters.
Figure 4B:
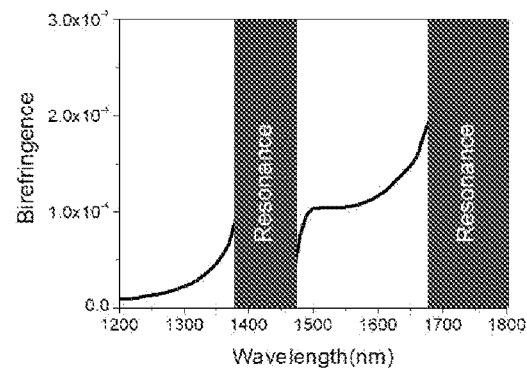
Figure 4C:
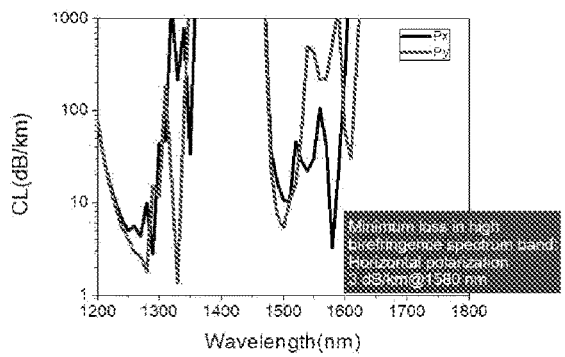
Figure 4D:
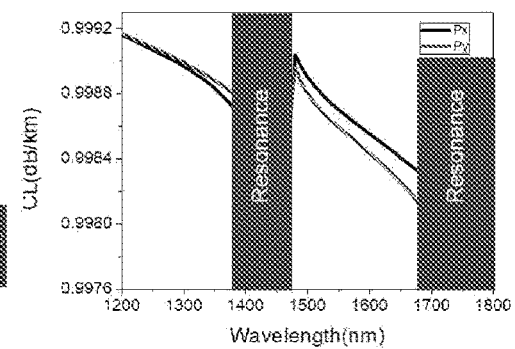

As shown in FIG. 3, the end surfaces of the third thin walls 23 are concentric fan-shaped thin-walled structures with outward openings, and the two third thin walls 23 are of concentric structures. It should be noted that the first or second thin walls may not be concentric with the third thin walls or concentric with the third thin walls.

Figure 5:
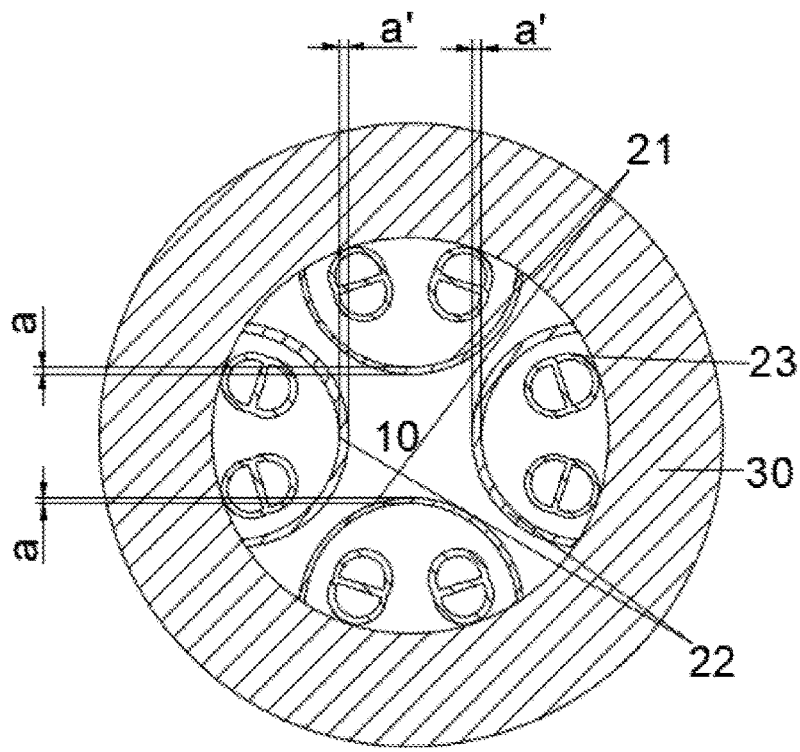
FIG. 5 is a structural diagram of an end surface/radial section of a polarization-maintaining hollow-core antiresonant fiber in another embodiment of the present disclosure.
Figure 6A:
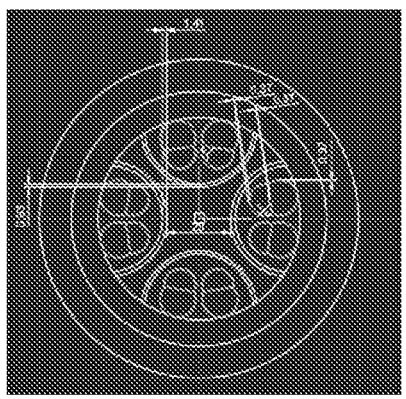
FIG. 6A to FIG. 6D are the loss and birefringence curves, calculated by using finite element simulation, of the structure shown in FIG. 5 in the case of exemplary constraints of some structural parameters.
Figure 6B:
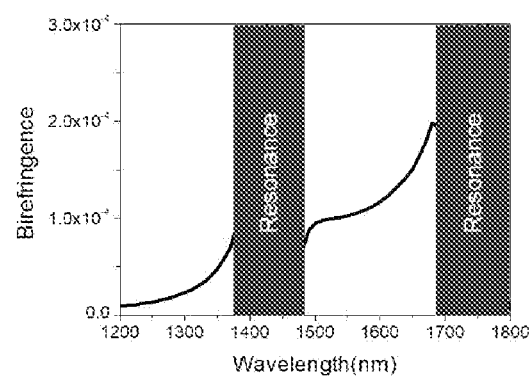
Figure 6C:
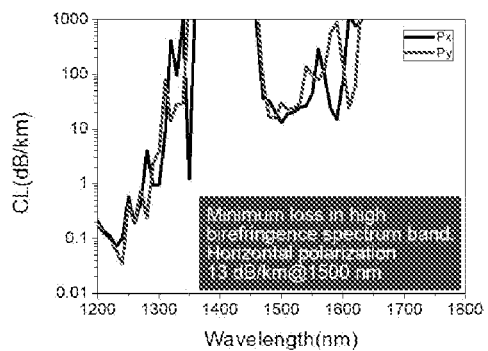
Figure 6D:
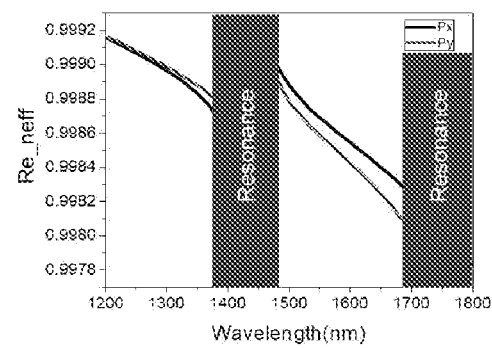

As shown in FIG. 5, the end surfaces of the third thin wall 23 are of annular thin-walled structures provided with thin-walled spacers in the centers.

Figure 7:
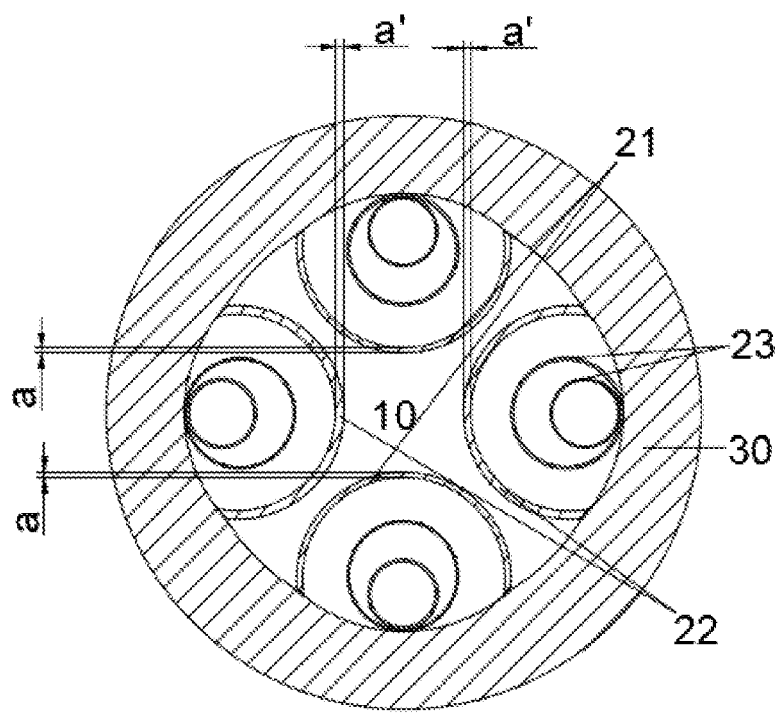
FIG. 7 is a structural diagram of an end surface/radial section of a polarization-maintaining hollow-core antiresonant fiber in another embodiment of the present disclosure.
Figure 8A:
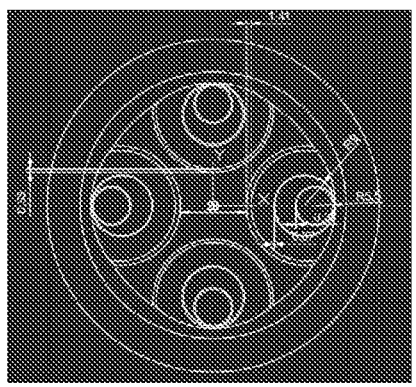
FIG. 8A to FIG. 8D are the loss and birefringence curves, calculated by using finite element simulation, of the structure shown in FIG. 7 in the case of exemplary constraints of some structural parameters.
Figure 8B:
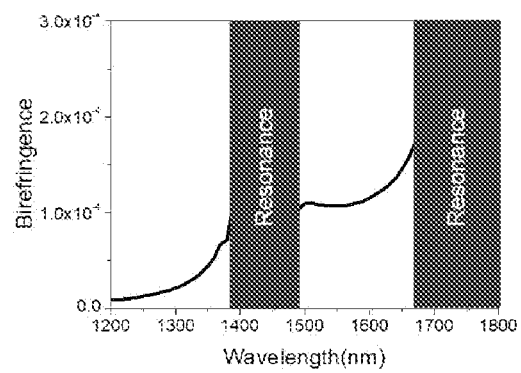
Figure 8C:
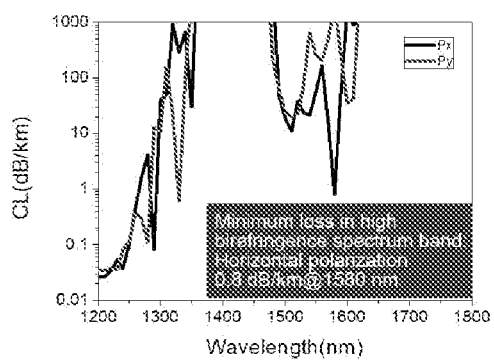
Figure 8D:
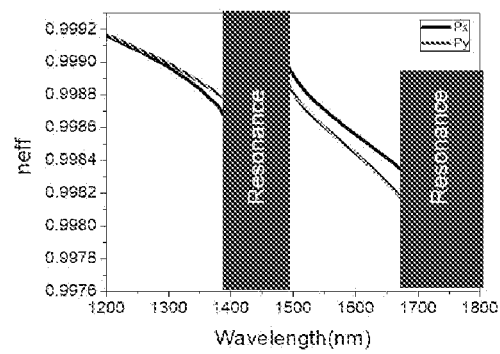

As shown in FIG. 7, the third thin walls 23 are of the nested casing structures.

It can be understood that these parameters, such as the diameters of the third thin walls, the diameters of nested casing thin walls, each wall thickness, and the diameter of the fiber core, can be adjusted according to the requirement of antiresonance due to self requirement of antiresonance.

Meanwhile, in order to realize different polarization-maintaining performance, other parameters can be further adjusted.

By way of example but not limitation, the diameters of the third thin walls may be 0.4 to 0.6 times the diameter of the fiber core. The diameters of the high-refractive index nested casing thin walls in the closed cavity may be respectively 0.8 to 1.2 times and 0.4 to 0.6 times the diameter of the fiber core.

By way of example but not limitation, the wall thickness of one of the first thin walls and the second thin walls is 0.9 μm, and the wall thickness of the other one is 1.4 μm, which satisfies the relationship that the wall thickness of one of the first thin walls and the second thin walls is about 1.5 times that of the other one. These parameters are empirical values, and are also selected depending on the ratio of a working wavelength to the diameter of the fiber core. For example, with regard to the working wavelength of 1.5 μm and the size of the fiber of 20 μm, the inner side structure needs to meet the birefringence with the magnitude order of 10−4 to achieve a low-loss and polarization-maintaining fiber.

In one of the embodiments, the end surfaces of the first thin walls 21 and the second thin walls 22 are fan-shaped thin-walled structures with quasi quadruple symmetry and outward openings, and the quadruple symmetry is upper and lower symmetry and left and right symmetry. The first thin walls 21 and the second thin walls 22 have wall thickness difference in the orthogonal directions, that is, the two first thin walls 21 have equal wall thickness a in the first direction, the two second thin walls 21 have equal wall thickness a' in the second direction, and the wall thickness a of the first thin walls 21 in the first direction is not equal to the wall thickness a' of the first thin walls 21 in the second direction.

In one of the embodiments, the first thin walls 21 and the outer layer 30 form four closed cavities. Two third thin walls 23 are arranged in each closed cavity.

Further, in another embodiment, the wall thicknesses of the first, second, and third thin walls of the present disclosure are in the same magnitude order of the working wavelength of the fiber. The specific wall thickness ratios of the wall thicknesses of the first, second, and third thin walls can be selected according to the wall thickness of the high-refractive index medium corresponding to a conventional anti-resonant reflector band or a hybrid anti-resonant reflector band of the working wavelength of the fiber. It should be noted that the fiber of the present disclosure can select related wall thickness parameters according to the light wave band, for example, the wall thickness of 50 nm to 5 μm is selected for the light wave band, and the wall thickness of several hundred of microns or several millimeters may also be selected for the Terahertz band.

In addition, the wall thickness b of the third thin walls 23 is in the same magnitude order as the wavelength. Generally, the wall thickness of the high-refractive index medium corresponding to the position where the working wavelength occurs the anti-resonant reflection or near the position where the working wavelength occurs the anti-resonant reflection is selected as the wall thickness b of the third thin walls 23.

Further, any two of the first thin walls 21 are not in contact with each other, any two of the third thin walls 32 are not in contact with each other, and the first thin walls 21 are not in contact with the third thin walls 23.

It can be seen from the FIGS. 2A to 2D, 4A to 4D, 6A to 6D and 8A to 8D that the birefringence of the fiber designed according to the above-mentioned structures in the FIGS. 1, 3, 5 and 7 can meet the magnitude order of 10−4 at the working wavelength in a certain range by adjusting its parameters, and meanwhile, the loss may be lower than 1 dB/km. For example, the loss in FIG. 8 can even reach 0.8 db/km.

Figure 9:
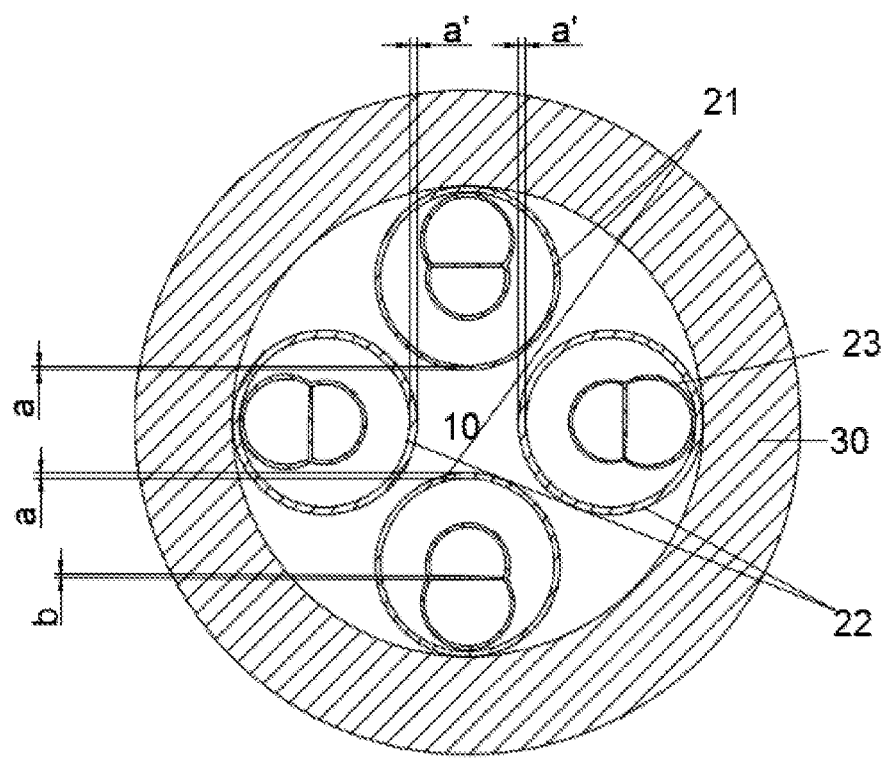
FIG. 9 is a structural diagram of an end surface/radial section of a polarization-maintaining hollow-core antiresonant fiber in another embodiment of the present disclosure.

It can be found that, FIGS. 1, 3, 5 and 7 all reflect that the inner side structure is also provided with a structure that can effectively amplify the birefringence effect. The structure may include: four fan-shaped thin-walled structures with thin walls in quasi quadruple symmetry. Four thin-walled circular structures with quasi-quadruple symmetry may refer to FIG. 9.

In conclusion, the fiber of the present disclosure is simple and reasonable in structure, can meet the characteristic of high birefringence, and can reach the magnitude order of 10–4. Even, in some structures, the high birefringence is ensured, and meanwhile, the loss can also be lower than 1 dB/km.

Comparing the above Figures, it can be understood that, on one hand, the present disclosure reduces the transmission loss and suppresses the leakage of light through the third thin walls 23 of the inner layer, and on the other hand, it introduces high birefringence in the second direction through the wall thickness difference between the first thin walls 21 and the second thin walls 22 of the inner layer in the orthogonal directions, and effectively amplifies the birefringence effect achieved by the wall thickness difference through the quasi multi-symmetry, for example, the quasi quadruple symmetry, of the first thin walls 21 and the second thin walls 22 of the inner layer, so that the fiber of the present disclosure has high birefringence, and meanwhile, has low transmission loss. In addition, the structure, especially FIG. 1, of the present disclosure is relatively simple.

The foregoing descriptions are merely embodiments of the present disclosure, but are not intended to limit the present disclosure. For those skilled in the art, the present disclosure may have various modifications and variations. Any modification, equivalent replacement, improvement or the like made within the spirit and principle of this disclosure shall fall within the protection scope of this disclosure.

What is claimed is:

1. A polarization-maintaining hollow-core antiresonant fiber, comprising:
   a hollow fiber core consisting of a low-refractive index medium for guiding the light to transmit in an axial direction of the fiber,
   an inner layer being a high and low refractive index composite cladding area, and
   an outer layer consisting of a high-refractive index medium, having a circular inner wall and a circular outer wall, wherein the hollow fiber core, the inner layer, and the outer layer are in sequence in the direction from the inside to the outside of the fiber, wherein
   the inner layer comprises an inner side structure close to the fiber core and an outer side structure further away from the fiber core, and the outer side structure is located between the inner side structure and the outer layer;
   the inner side structure comprises two first thin walls, two second thin walls and two third thin walls; wherein the two first thin walls and the two second thin walls are not in contact with one another and are orthogonally and symmetrically distributed on the periphery of the fiber core to realize birefringence, and the two first thin walls and the two second thin walls are supported by the outer layer, wherein the two first thin walls are spaced by the fiber core in a first direction, and the two second thin walls are spaced by the fiber core in a second direction orthogonal to the first direction; the wall thicknesses of the two first and the two second thin walls are not the same; the two first thin walls and the two second thin walls are four fan-shaped thin-walled structures with thin walls in quasi quadruple symmetry and outward openings; the quasi quadruple symmetry refers to that on the basis of complete quadruple symmetry; the two first thin walls in the first direction have the first wall thickness a; and the two second thin walls in the second direction have the second wall thickness a'; where the first wall thickness a is not equal to the second wall thickness a'; and the outer side structure comprises four closed cavities, wherein any one of the four first and second thin walls and the outer layer form a closed cavity, and each closed cavity is provided with at least two third thin walls, wherein the two third thin walls are disposed in each of the four fan-shaped thin-walled structures in the outer side structure and reduce transmission loss of the fiber and suppress leakage of light.

2. The fiber according to claim 1, wherein the two third thin walls are arranged in each closed cavity.

3. The fiber according to claim 1, wherein the wall thickness difference between either of the first thin walls in the first direction and either of the second thin walls in the second direction exceeds 10% of the wall thickness value of either of the two thin walls.

4. The fiber according to claim 1, wherein the two first thin walls in the first direction have equal wall thickness or the wall thickness difference less than 10% of the wall thickness value of either of the thin walls.

5. The fiber according to claim 1, wherein the two second thin walls in the second direction have equal wall thickness or the wall thickness difference less than 10% of the wall thickness value of either of the thin walls.

6. The fiber according to claim 1, wherein the wall thickness of the first, second, and third thin walls are valued according to the difference of light guide bands or the difference of Terahertz bands.

7. The fiber according to claim 1, wherein the first thin walls and the second thin walls are two types of thin walls, wherein the wall thickness of either of the thin walls of each type is uniform and consistent.

8. The fiber according to claim 1, wherein any two of the second thin walls are not in contact with each other, and the first thin walls are not in contact with the second thin walls.

9. The fiber according to claim 1, wherein the first thin walls, the second thin walls, and the third thin walls all have equal refractive index.

10. The fiber according to claim 1, wherein end surfaces of the third thin walls are of two separated annular thin-walled structures, and the two third thin walls are uniformly distributed in the closed cavity.

11. The fiber according to claim 1, wherein end surfaces of the third thin walls are concentric fan-shaped thin-walled structures with outward openings, and the two third thin walls are of concentric structures.

12. The fiber according to claim 1, wherein end surfaces of the third thin walls are of annular thin-walled structures provided with thin-walled spacers in the centers.

13. The fiber according to claim 1, wherein the two third thin walls are of the nested casing structures.

* * * * *